United States Patent [19] [11] Patent Number: 4,642,653
Ito et al. [45] Date of Patent: Feb. 10, 1987

[54] MULTI-TONE RECORDING METHOD FOR INK JET PRINTER

[75] Inventors: Tadashi Ito, Yokohama; Koichiro Jinnai, Kawasaki; Takahisa Koike, Tokyo; Toshiharu Murai, Yokohama; Takao Fukazawa, Tokyo; Kazumi Ishima, Kashiwa, all of Japan

[73] Assignee: Ricoh Company, Ltd., Tokyo, Japan

[21] Appl. No.: 857,395

[22] Filed: Apr. 21, 1986

Related U.S. Application Data

[63] Continuation of Ser. No. 669,831, Nov. 9, 1984, abandoned.

[30] Foreign Application Priority Data

Nov. 9, 1983 [JP] Japan ................................ 58-210509

[51] Int. Cl.$^4$ ............................................. G01D 15/18
[52] U.S. Cl. ......................................... 346/1.1; 346/75
[58] Field of Search ................................. 346/1.1, 75

[56] References Cited

U.S. PATENT DOCUMENTS

| | | | |
|---|---|---|---|
| 4,115,787 | 9/1978 | Fujimoto et al. | 346/75 |
| 4,115,788 | 9/1978 | Takano et al. | 346/75 |
| 4,189,754 | 2/1980 | Gamblin | 358/296 |
| 4,303,925 | 12/1981 | Harbour, Jr. et al. | 346/1.1 |

Primary Examiner—E. A. Goldberg
Assistant Examiner—Gerald E. Preston
Attorney, Agent, or Firm—Oblon, Fisher, Spivak, McClelland & Maier

[57] ABSTRACT

A method for a charge control and multi-step deflection control type ink jet printer is disclosed which renders halftone by multi-step gradation. When an ink ejected from a nozzle is to be charged, a charging voltage is suitably varied to cause a shift in deflection by a pitch smaller than one dot pitch in the deflection direction, thereby selectively causing dots in the deflection direction to overlap and separate from each other. The pitch for developing the shift is variable to control the overlapping or separating degree of the dots in order to accomplish gradation in numerous densities.

3 Claims, 14 Drawing Figures

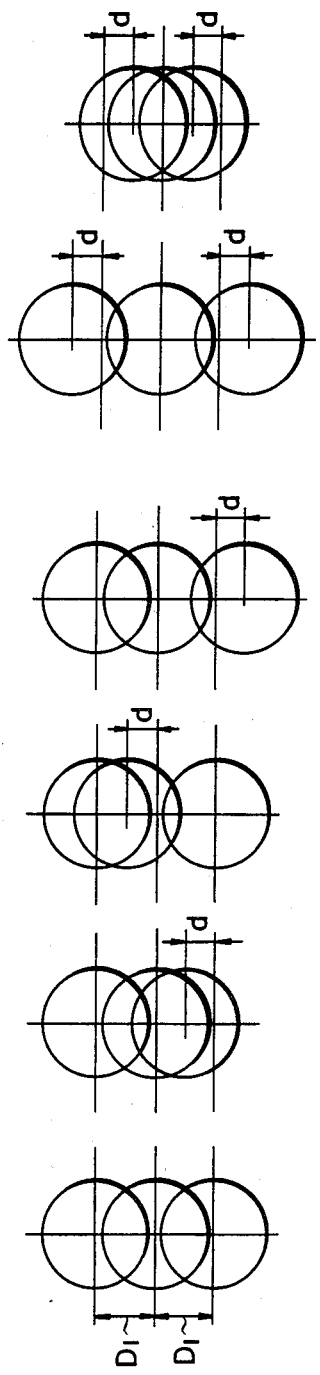

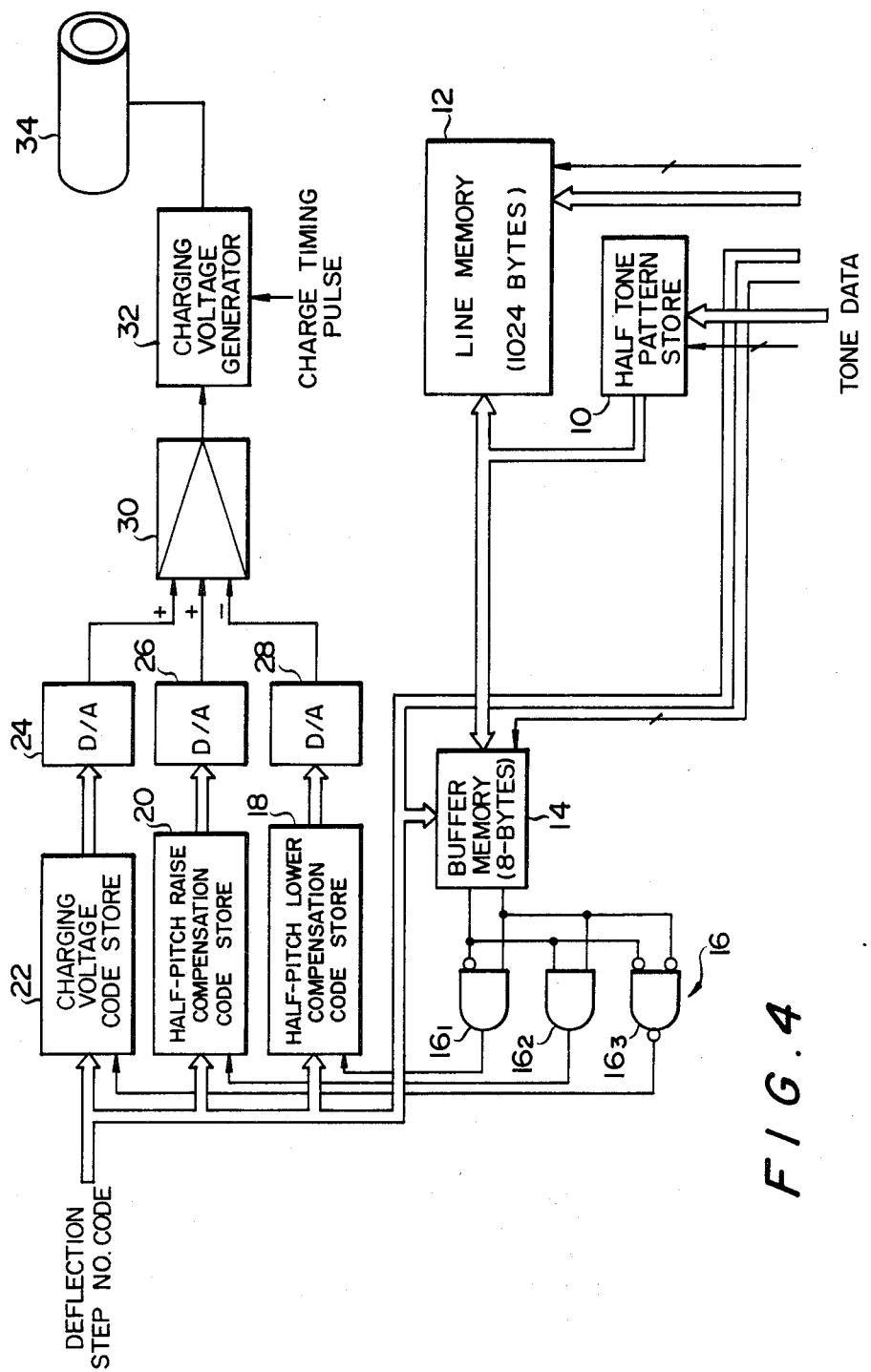
F I G. 4

MULTI-TONE RECORDING METHOD FOR INK JET PRINTER

This application is a continuation, of application Ser. No. 669,831, filed 11-9-84 now abandoned.

BACKGROUND OF THE INVENTION

The present invention relates to a multi-tone recording method for a charge control and multi-step deflection control type ink jet printer which selectively charges an ink drop by a plurality of charging voltages upon separation of the drop from ink issuing from a nozzle and, then, selectively deflects charged drop in a plurality of steps by a deflection electric field based on the amount of charge deposited thereon.

A typical prior art ink jet printer employs thirty-two consecutive steps for deflection so as to selectively charge ink drops in thirty-two different steps and, thereby, prints out data by thirty-two dots in a vertical array, for example. In this case, a carriage with an ink ejection head and others mounted thereon is moved in a horizontal direction so that data may be recorded over a width of thirty-two dots by a single printing stroke of the carriage.

For gradation recording, or halftone recording, the ink jet printer of the type described operates on the basis of a unit dot matrix having four dots in the longitudinal (vertical) direction and four dots in the transverse (horizontal) direction (one pattern consisting of a 4×4 dot matrix), representing sixteen different densities by determining whether or not to print out on each of the dot positions. Even such an approach may fail to provide a desired number of tones. Then, assuming a region wherein two dots are to be printed out in the longitudinal direction, the recording density, or density determined by a recording area relative to a predetermined area, is higher when two dots are printed out overlapping each other in the longitudinal direction as shown in FIG. 1B than when a single dot is printed out as shown in FIG. 1A. Further, in the case of the two dots, the resulting recording density is higher when they are printed out without overlapping as shown in FIG. 1C. Such provides the following six different patterns when considered in a matrix pattern having two dots longitudinally and two dots transversely. In matrix patterns shown below, dot positions labeled "0" represent non-print positions and those labeled "1", print positions. When "1" is followed by another "1" in the longitudinal or transverse direction, the dots overlap; however, when it is aligned with another "1" diagonally, the dots do not overlap. The recording density sequentially increases from the leftmost pattern to the rightmost.

| 0 0 | 1 0 | 1 0 | 1 0 | 1 1 | 1 1 |
|-----|-----|-----|-----|-----|-----|
| 0 0 | 0 0 | 1 0 | 0 1 | 0 1 | 1 1 |

As shown above, the 2×2 dot pattern provides six different tones which is larger than four. It follows that a larger number of tones are attainable by employing such a dot diameter and a dot pitch which allow dots to overlap in the longitudinal and transverse directions but not in the diagonal one, and using such tone patterns with the dot distributions shown in FIGS. 1B and 1C. However, there is a keen demand for extra tones for the representation of halftones.

SUMMARY OF THE INVENTION

It is therefore an object of the present invention to provide a multi-tone recording method for a charge control type ink jet printer which is capable of accomplishing a desirably large number of tones, or densities.

It is another object of the present invention to provide a generally improved multi-tone recording method for a charge control type ink jet printer.

A multi-tone recording method for a charge control type ink jet printer which renders halftone by recording data in multiple densities of the present invention comprises the steps of charging ink drops issuing from an ink ejection nozzle in a plurality of steps by a plurality of charging voltages, deflecting the charged ink drops in a plurality of steps based on an amount of charge deposited on each of the charged ink drops, and in each of the charging steps, varying the charging voltage within a predetermined range which provides a shift in deflection by a pitch smaller than one dot pitch in a deflection direction.

In accordance with the present invention, a method for a charge control and multi-step deflection control type ink jet printer is disclosed which renders halftone by multi-step gradation. When an ink ejected from a nozzle is to be charged, a charging voltage is suitably varied to cause a shift in deflection by a pitch smaller than one dot pitch in the deflection direction, thereby selectively causing dots in the deflection direction to overlap and separate from each other. The pitch for developing the shift is variable to control the overlapping or separating degree of the dots in order to accomplish gradation in numerous densities.

The above and other objects, features and advantages of the present invention will become apparent from the following detailed description taken with the accompanying drawings.

BRIEF DESCRIPTION OF THE DRAWINGS

FIGS. 2A–2C and 3A–3F are plan views of dot distributions representative of a method for halftone representation in accordance with the present invention;

FIG. 4 is a block diagram of essential part of an apparatus for practicing the method of the present invention.

DESCRIPTION OF THE PREFERRED EMBODIMENT

While the multi-tone recording method for an ink jet printer of the present invention is susceptible of numerous physical embodiments, depending upon the environment and requirements of use, a substantial number of the herein shown and described embodiment have been made, tested and used, and all have performed in an eminently satisfactory manner.

Figures 1A, 1B, 1C:
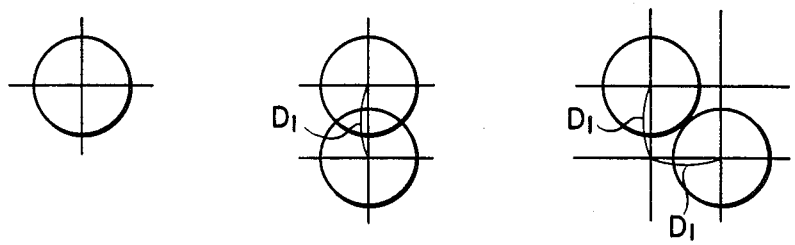
FIGS. 1A–1C are plan views of dot distributions provided by ink jet recording and representative of a prior art method for halftone representation.
Figures 2A, 2B, 2C:
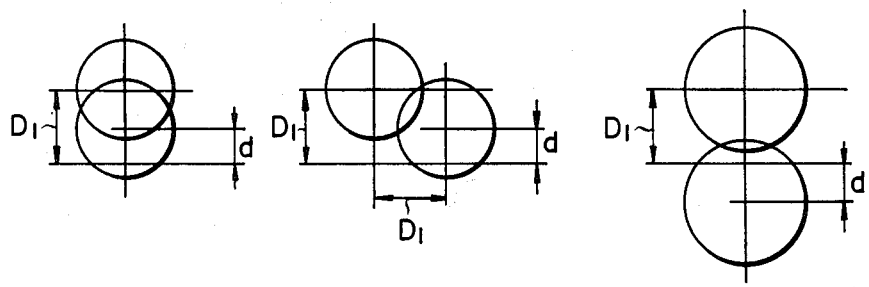

Referring to FIGS. 1A–1C, assume that a dot pitch $D_1$ (longitudinal) and a dot pitch $D_2$ (transverse) are the standard dot pitches. When dots are printed out by shifting the lower dot shown in FIG. 1B or 1C upwardly by half a pitch d, they appear as shown in FIG. 2A or 2B. The recording density shown in FIG. 2A is intermediate between those shown in FIGS. 1A and 1B, and the recording density shown in FIG. 2B is intermediate between those shown in FIGS. 1B and 1C.

The same principle is applicable even to three longitudinally aligned dots, for example. Assuming that the dot recording positions shown in FIG. 3A are the standard positions, introducing a longitudinal shift by half a pitch d provides five different patterns as shown in FIGS. 3B–3F even when all the thee dots are printed out. The recording density in the three-dot case sequentially increases in the order of FIG. 3F, FIG. 3B, FIG. 3C, FIG. 3A, FIG. 3D and FIG. 3E.

As discussed above, shifting the actual dot printing position from standard one in numerous patterns is effective to accomplish a remarkable increase in the number of tones for rendering halftone. While FIGS. 2A–2C and 3B–3F show upward and downward shifts each by half a pitch d only, other suitable pitches may further be utilized for the upward and downward shifts in order to represent halftone in a further greater number of tones.

In accordance with the present invention, a shift from a standard dot pitch which is smaller than one pitch is employed to attain a considerable number of tones for halftone representation. In the representation of gradation employing such a shift, the number of dots assigned to one deflection width, such as thirty-two dots in the longitudinal direction, is naturally the same and, assuming that the ink drop forming rate (number of drops per second) is the same as the conventional, the time necessary for recording one deflection width, i.e., the time consumed for recording thirty-two dots is equal to one heretofore required. In this respect, the halftone representation with shifts does not entail any decrease in recording rate as is inherent in the case wherein the dot density, or number of dots within one deflection width, is simply increased, that is, the number of dots in a gradation representation pattern is increased.

Referring to FIG. 4, an apparatus for practicing the method of the present invention is shown. Tone data which is recording data (indicative of one of sixty-four recording densities 0–63) is applied to a halftone pattern store 10 which comprises a read only memory (ROM). Record control data (two bits for each dot) associated with a halftone pattern (4×4 dots) which is accessed by the input tone data is read out of the store 10 and, then, stored in a line store 12 which comprises a random access memory 12. The halftone pattern store 10 stores therein sixty-four sets of pattern data (sixty-four patterns) each having a 4-byte construction (thirty-two bits with two bits allocated to one dot) which is allocated to 4×4 dots. The record control data is either one of the instructions shown below in Table 1.

TABLE 1

| RECORD CONTROL DATA | INSTRUCTION |
| --- | --- |
| 0 0 | NON-PRINT |
| 0 1 | HALF PITCH LOWERED PRINT |
| 1 0 | STANDARD POSITION PRINT |
| 1 1 | HALF PITCH RAISED PRINT |

The line storage 12 has a capacity of eight bytes longitudinally (one deflection width having 32 dots and accommodating eight patterns) and 128 bytes transversely (128×8 dots and accommodating 127×2 patterns) (accommodating in total 8×254 tone data (patterns)). After halftone pattern data corresponding to longitudinal eight patterns (one deflection width: thirty-two dots) and transverse 254 patterns (254×4 dots) have been stored in the line store 12 in response to input tone data, the record control data are read out of the store 12 vertical eight patterns (one deflection width: corresponding to thirty-two dots) at a time for recording each deflection width and, then, temporarily stored in a buffer memory (8-byte RAM) 14. From the buffer memory 14, the record control data are sequentially applied to a decoder 16 two bits at a time which are designated by a deflection step code in synchronism with drop forming timing pulses. The decoder 16 comprises AND gates $16_1$ and $16_2$ and a NAND gate $16_3$.

Figure 5:
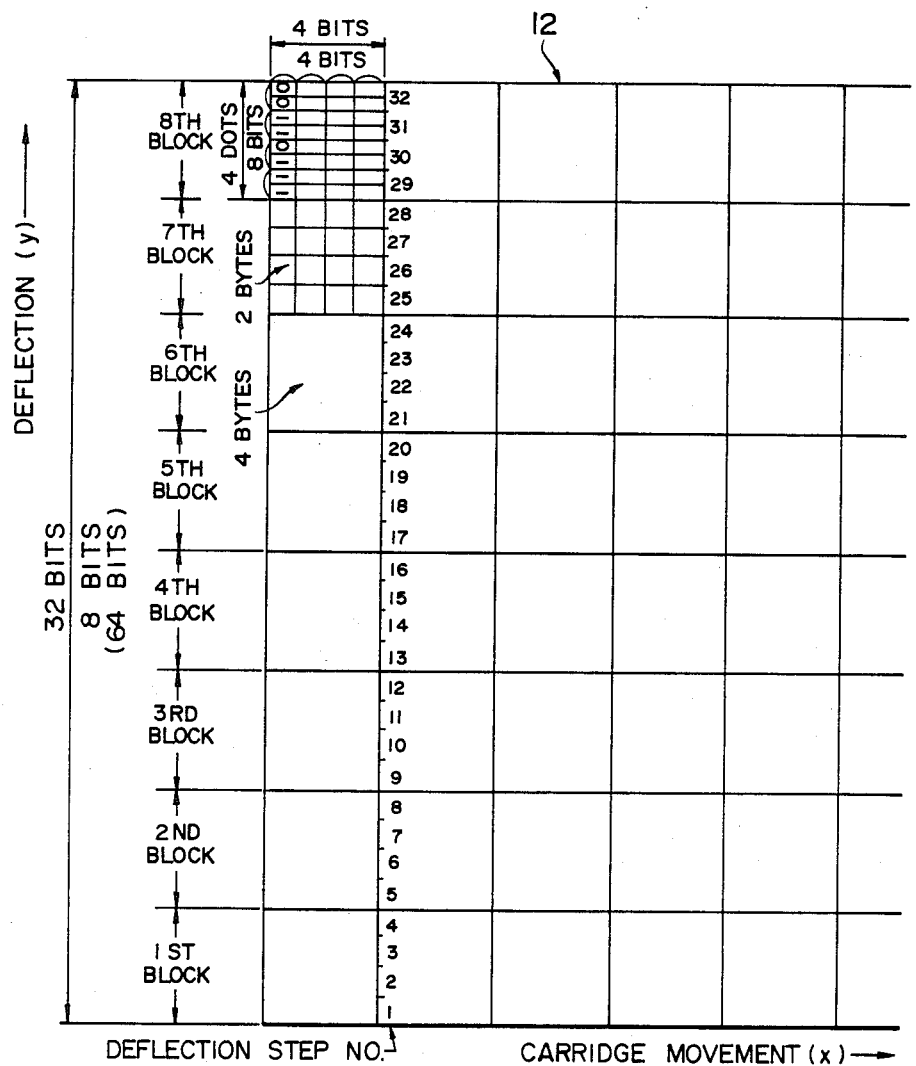
FIG. 5 is a schematic plan view of distribution of data stored in a line memory.

Referring to FIG. 5, a schematic area allocation of the line store 12 is shown. In FIG. 5, each of the square area indicated by a thick line represents an area for storing record control data associated with one pattern (4×4 dots; four bytes). Since one record control data (two bits) is assigned to each of the deflection steps 1-32, sixty-four bits are included in the deflection direction (longitudinal direction y). Every time one deflection width is to be recorded, the record control data are transferred to the buffer memory 14 by each sixty-four bits. The data stored in the buffer memory 14 are sequentially read thereout of two bits at a time which are designated by a deflection step code, timed to drop forming timing pulses, the data being applied to the decoder 16.

In the decoder 16, the AND gate $16_1$ develops a high or logical "1" output when the record control data is "01" which instructs the "half pitch lowered print" (Table 1), and applies the output as a read instruction signal to a half pitch lower compensation code store 18 which comprises a ROM. The AND gate $16_2$, when the record control data is "11" instructing the "half pitch raised print", develops a high or logical "1" output and supplies it as a read instruction signal to a half pitch raise compensation code store 20, which also comprises a ROM. Further, the NAND gate $16_3$ when the record control data is other than "00" which instructs the "non-print", produces a high or logical "1" output and applies it as a read instruction signal to a charging voltage (standard) code store 22.

The charging voltage code store 22 stores thirty-two standard charging voltage codes which are associated with the first to thirty-second deflection steps, respectively. The half pitch raise compensation code store 20 stores charging voltage compensation data for causing an upward half-pitch shift in each of the first to thirty-second deflection steps. The half pitch lower compensation code store 18 stores charging voltage compensation data for causing a downward half-pitch shift in each of the first to thirty-second deflection steps.

The code stores 18, 20 and 22 and the buffer memory 14 are individually accessed by a deflection step code indicative of a particular number assigned to a deflection step. Each of the code stores 18, 20 and 22 produces a charging voltage code in a predetermined number of figures, while the buffer memory 14 produces record control data (two bits). The data read out of the code stores 18, 20 and 22 are converted to analog signals by digital-to-analog (D/A) converters 24, 26 and 28, respectively. Outputs of the D/A converters 24, 26 and 28 in turn are applied to an adder/subtractor 30 which comprises an operational amplifier. The analog signals associated with the outputs of the stores 22 and 20 are applied to addition terminals of the adder/subtractor 30, while the analog signal associated with the output of the store 18 is applied to a subtraction terminal. An output of the adder/subtractor 30 is delivered to a charging voltage generator 32 to which is applied a charge timing pulse synchronous with formation of an ink drop. While the charge timing pulse is high or logical "1" level, the charging voltage geneator 32 generates a voltage corresponding to a level of the input analog signal and applies it to a charging electrode 34.

In the above construction and operation, when the output of the buffer memory 14 (2-bit record control data) is "00", none of the stores 18, 20 and 22 is supplied with a read instruction signal and, therefore, their outputs commonly indicate zero. In this situation, the output of the adder/subtractor 30 is at a non-charge level so that substantially no charging voltage is applied to the charging electrode 34. Ink drops are caught by a gutter without printing out dots on a paper.

When the output of the buffer memory 14 is "01", the stores 22 and 18 are supplied with read instruction signals so that the adder/subtractor 30 geneates an analog signal associated with a value produced by subtracting the data read out of the store 18 from the data read out of the store 22. As a result, a charging voltage which effects half-pitch lowered printing is applied to the charging electrode 34, whereby an ink drop impinges on the sheet in a position half a pitch lower than a deflection position designated by the deflection step code.

If the output of the buffer memory 14 is "10", only the store 22 is supplied with a read instruction signal. Then, a standard charging voltage is applied to the charging electrode 34 to cause an ink drop to impinge on the sheet in a position designated by the deflection step code (standard position).

Further, if the output of the buffer memory 14 is "11", the stores 22 and 20 are supplied with read instruction signals. Then, a charging voltage which is the sum of a standard charging voltage and a voltage corresponding to half-pitch raising is applied to the charging electrode 34 with the result that an ink drop prints out a dot in a position half a pitch higher than a deflection position designated by the deflection step code.

In the illustrative embodiment, one pattern comprises 4×4 dots and the data (two bits) shown in Table 1 are assigned to each of the dots. In the conventional simple halftone recording, data assigned to each dot is merely "non-print" and "print" and the number of tones attaintable therewith is not more than sixteen; even when increased by the longitudinal and horizontal (FIG. 1B) overlapping and diagonal (FIG. 1C) non-overlapping scheme, the number is twenty-four at the maximum. In accordance with the illustrative embodiment of the present invention, four different tones are rendered by two longitudinally aligned dots, that is, as many as thirty-two tones by a 4×4 dot pattern. Furthermore, employing the longitudinal and transverse overlapping and diagonal overlapping in combination, more than sixty-four tones may be rendered by a 4×4 dot pattern and the density difference between nearby tones becomes smaller to promote smooth gradation of halftone. The halftone pattern store 10 stores record control data associated with sixty-four patterns, 0–63.

Although in FIG. 4 the store 22 storing standard charging voltage codes and the stores 18 and 20 storing compensation voltage codes are shown as discrete elements, they may be implemented by a single memory. For example, where use is made of a parallel 1-byte output memory, consecutive three bytes may be assigned to the one deflection step charging voltage code stores and, of the thee bytes, the first byte may assigned to the standard charging voltage code store, the second byte to the half-pitch raise compensation code memory, and the third byte to the half-pitch lower compensation charging code memory. In that case, the three bytes will be subjected to selective addition/subtraction by decoding record control data.

Where the stores 18, 20 and 22 are implemented by a three-byte parallel output memory, store codes may be assigned with the above-described principle so as to selectively add and subtract the parallel output data in response to record control data. In the case where the half-pitch rase and half-pitch lower compensation voltages are substantially the same in absolute value, that is, where the half-pitch raise the half-pitch lower compensations are effected using the same compensation voltage absolute value, a compensation code may be added to or subtracted from a standard charging voltage code based on record control data in order to save, for example, one byte.

While the increase in the number of tones has been accomplished in the illustrative embodiment by raising or lowering a dot by half a pitch, it may be implemented by shifts by a smaller dot pitch such as one third or even one fourth a pitch when the standard dot pitch is relatively rough.

Although the present invention has been shown and described in relation with a multi-level deflection type printer, it is naturally applicable to a two-level type as well.

In summary, it will be seen that the present invention provides a multi-tone recording method for an ink jet printer which remarkably increases the number of tones for halftone representation and enhances smooth gradation and, yet, eliminates the need for a larger number of dots (higher dot density) which would be detrimental to recording rate.

Various modifications will become possible for those skilled in the art after receiving the teachings of the present disclosure without departing from the scope thereof.

What is claimed is:

1. A recording method for a charge control type ink jet printer which renders halftone by recording data in multiple densities, comprising the steps of:
    (a) charging ink drops issuing from an ink ejection nozle in a plurality of steps by a plurality of charging voltages;
    (b) deflecting the charged ink drops in a plurality of steps based on an amount of charge deposited on each of the charged ink drops; and
    (c) said charging step comprising,
        storing in a memory plural sets of halftone data which respectively correspond to a different recording density for a common number of dots in a unit deflection width,
        selecting one of said sets of halftone pattern data in correspondence with a desired recording density, and
        varying the charging voltage within a predetermined range which provides a shift in deflection by a pitch smaller than one dot pitch in a deflection direction in accordance with the selected halftone pattern data, thereby controlling the degree of overlapping or separation of adjacent dots to accomplish recording gradation at least in part based on the shift in deflection by said pitch smaller than one dot pitch.

2. A recording method as claimed in claim 1, wherein step (c) comprises the steps of (d) specifying, in response to tone data, halftone pattern data having record control data representative of one of non-printing, printing in a predetermined position, and printing with a shift, and assigned one to each dot, (e) specifying a charging voltage by computing a charging voltage in response to the record control data of the specified halftone pattern data, and (f) charging an ink drop by the specified charging voltage.

3. A recording method as claimed in claim 2, wherein step (c) further comprises the steps of (g) in response to deflection step data indicative of an expected deflection step for recording and record control data, reading a charging voltage code out of a charging voltage code store which stores charging voltage codes associated with the respective deflection steps and not causative of shifts, (h) in response to the deflection step data and the record control data, reading a compensation amount code out of a compensation amount code store which stores compensation amount codes, and (i) determining a charging voltage in response to the charging voltage code and the compensation amount code.

* * * * *